March 1, 1960 H. H. TALBOYS 2,926,616
TRACK LINING MACHINE
Filed Nov. 4, 1954 9 Sheets-Sheet 5

Inventor
Henry H. Talboys
by Parker & Carter
Attorneys

March 1, 1960 H. H. TALBOYS 2,926,616
TRACK LINING MACHINE
Filed Nov. 4, 1954 9 Sheets-Sheet 7

Inventor
Henry H. Talboys
by Parker & Carter
Attorneys

Inventor
Henry H. Talbois by Parker & Carter
Attorneys

United States Patent Office 2,926,616
Patented Mar. 1, 1960

2,926,616

TRACK LINING MACHINE

Henry H. Talboys, Milwaukee, Wis., assignor to Nordberg Manufacturing Company, Milwaukee, Wis., a corporation of Wisconsin Application November 4, 1954, Serial No. 466,819

8 Claims. (Cl. 104—8)

This invention is directed to a new and improved machine for accurately lining a railway track.

The present invention utilizes certain principles disclosed in application Serial No. 265,741, filed on January 10, 1952, in the name of Frank J. Herlehy, now U.S. Patent No. 2,693,769. In that application a track lining machine is designed so as to be locked to the rails of a track, thus forming a generally unitary structure of the machine and the track. In that machine, ballast engaging elements are carried by the machine and are forced downwardly against the ballast with sufficient pressure to relieve substantially the entire weight of the unitary structure formed from the machine and track from the ballast. When the weight of this unitary structure is relieved from the ballast, a mechanism carried by the machine directs a lateral thrust against the track, so that the track and machine are shifted laterally in desired amounts. The machine is so designed that in normal operation, the ties of the track are not actually lifted from the ballast and for this reason, the ballast bed under the track will not be disturbed to any material extent, during the track lining operation.

Another advantage in that type of machine is that the weight of the machine, in addition to the weight of the track to which the machine is locked, provides a relatively heavily loaded structure which has a relatively great resistance to the reactive pressure of the forces required to effect lateral movement of the track.

The present invention embodies several new and useful improvements in this type of machine.

One purpose of the present invention is the provision of an improved track lining assembly which does not interfere with the line of sight of a person directing the track lining operation by sighting along one rail of the track.

Another purpose of the present invention is the provision of an improved mechanism for locking a track lining machine to the supporting track.

Another purpose of the present invention is the provision of improved control means for a track lining machine.

Another purpose is an improved connection between ballast engaging and machine lifting elements which provides a slidable adjustment on the frame in a longitudinal direction with respect to the track and which directs the vertical thrust of the elements directly against the frame of the machine while, in effect, bypassing the slidable connection between the elements and the machine.

Another purpose is the provision of improved ballast engaging elements which allow accommodation of the elements to different track structures.

Another purpose is the provision of improved supporting wheels for a track machine which serve to prevent lateral movement of the machine with respect to the track but which, at the same time, allow the user of the machine to sight along one rail of the track.

Another purpose is the provision of improved means for converting an ordinary supporting roller for track machines to either a single or double flanged wheel for the machine.

Other purposes will appear from time to time in the course of the ensuing specification and claims.

Referring generally now to the drawings.

Like elements are designated by like characteristics throughout the specification and drawings.

Figure 1:
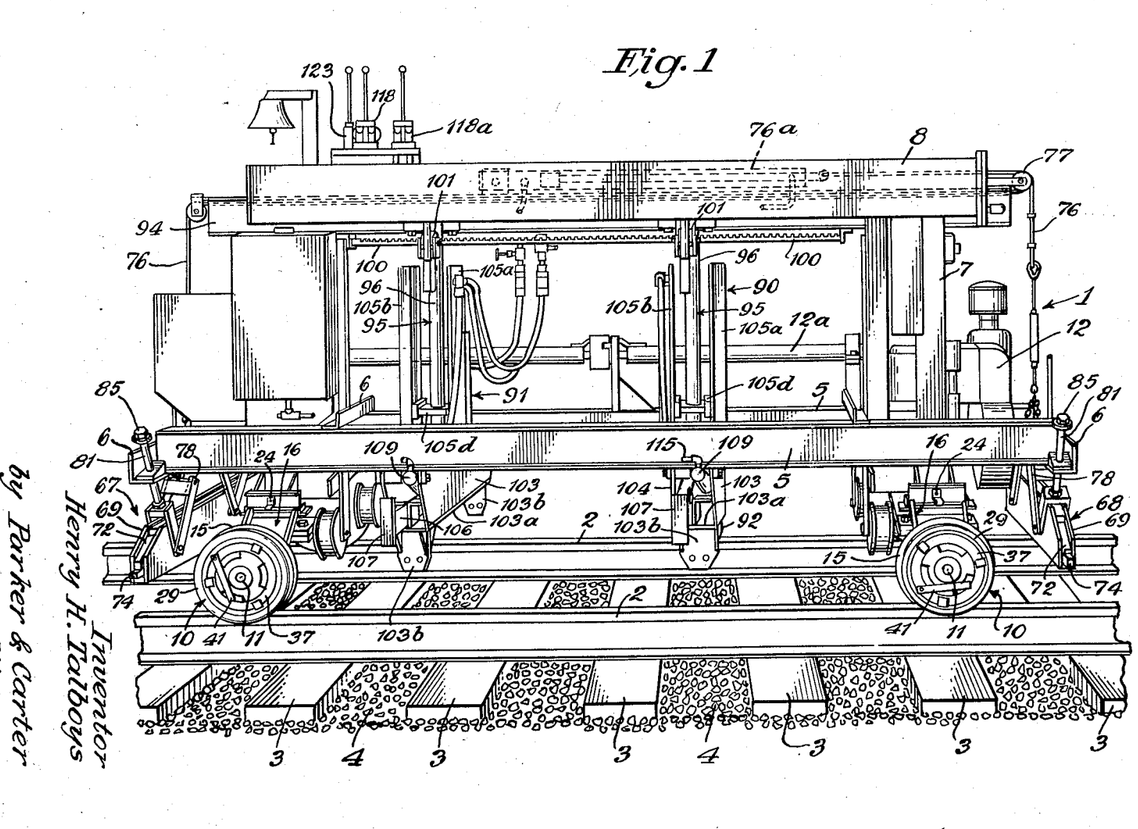
Figure 1 is an assembly view of the invention shown in side elevation.

Referring specifically now to the drawings and, in the first instance, to Figure 1 wherein I illustrate, more or less diagrammatically, the track lining machine embodying the present invention, 1 designates the machine, 2 the supporting rails which are, in turn, supported on the customary ties 3 supported on a bed of ballast 4. The machine includes longitudinally extending frame members 5, transversely extending frame members 6, and generally upright frame members 7. The particular form of supporting frame may be widely varied and for this reason the particular showing of the frame should be taken in a diagrammatic or illustrative sense. Upper longitudinally extending frame members 8 and 9 are joined to the upstanding members 7. The frame members 8 and 9 are hollow and serve not only as reinforcing elements for the frame but also serve as the reservoir for the hydraulic system which will be explained in greater detail in ensuing portions of this specification.

At each end of the frame are a pair of supporting wheels designated generally at 10. The wheels 10 may be mounted for rotation on any suitable transversely extending axles 11 which are supported by the frame of the machine.

An internal combustion engine 12 is positioned at one end of the machine and serves to supply power for the hydraulic system used in the machine and also serves to provide the power for propelling the machine along the track rails. Any suitable drive, such as a drive shaft 12a and chain 12b may transmit power from the motor 12 to one axle 11. An operator platform 13 may be provided on the machine.

Each of the supporting wheels 10 are identically formed and are shown in detail in Figures 10 to 17 inclusive. Each wheel includes a central roller 14 which has a width less than the width of the head of the rail 2. An inside flange 15 is mounted for rotation with respect to the axle 11 and sliding movement toward and away from the central roller 14. A locking member 16 is pivotally connected as at 17 with a hub 18 which is mounted for rotation with respect to the flange 15. The locking element 16 is selectively operable to hold the inner flange in either the extended position, shown by the left hand flange in Figure 10, or in the withdrawn position, shown by the right hand flange in Figure 10.

The locking elements 16 may take the form of spaced members 19 having recesses 20 which receive a ledge 21 carried by the frame. The recesses 20 and ledge 21 are positioned so that when they are engaged, one with the other, they are effective to hold the flange 15 in snug abutting relation with the roller 14. A plate 22 may be positioned between the members 19 and provided with a central opening 23 which receives a spring arm 24 positioned above the ledge 21. The spring arm 24 may include a portion 25, extending generally parallel with the axle 11, and an upstanding portion 26. It may be connected to the frame by any suitable bolt or the like 27. When it is desired to move the inner flange 15 inwardly away from the roller 14, the element 16 is rotated in a counter-clockwise direction about the pivot 17 (as in the left-hand wheel assembly shown in Figure 10), to a point where the members 19 and plate 22 will clear the spring member 24. The flange 15 is then moved inwardly toward the position illustrated by the right-hand inner flange in Figure 10 and the opening 23 is moved over the spring member 24 to the position shown in Figure 10 by the right-hand inner flange assembly. When in this position, the upstanding portion 26 of the spring member abuts against the plate and holds it in the position illustrated. When it is desired to move the flange outwardly into abutting relation with the roller 14, the outer end of the spring member 24 is depressed sufficiently to allow movement of the plate 22 out of engagement therewith and the inner flange 15 is moved outwardly to a position where the locking element 16 may be effective to hold the flange in its extended position.

Figure 14:
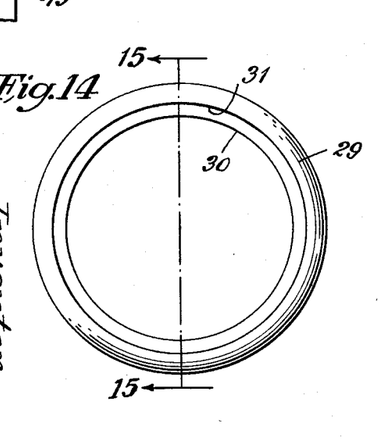
Figure 14 is a plan view of a typical wheel flange employed in the wheel construction shown in Figures 10 through 13.
Figure 15:
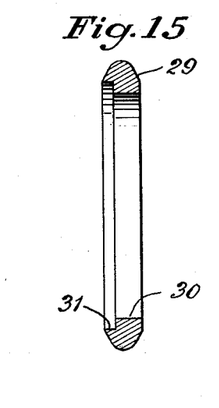
Figure 15 is a sectional view of the flange shown in Figure 14 taken along the section line 15—15 of Figure 14.
Figure 16:
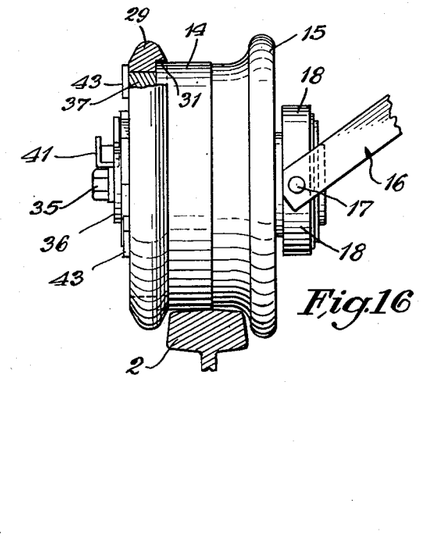
Figure 16 is an assembly view of the wheel construction shown in Figure 10 with certain elements being shown in section for purposes of clarity.
Figure 17:
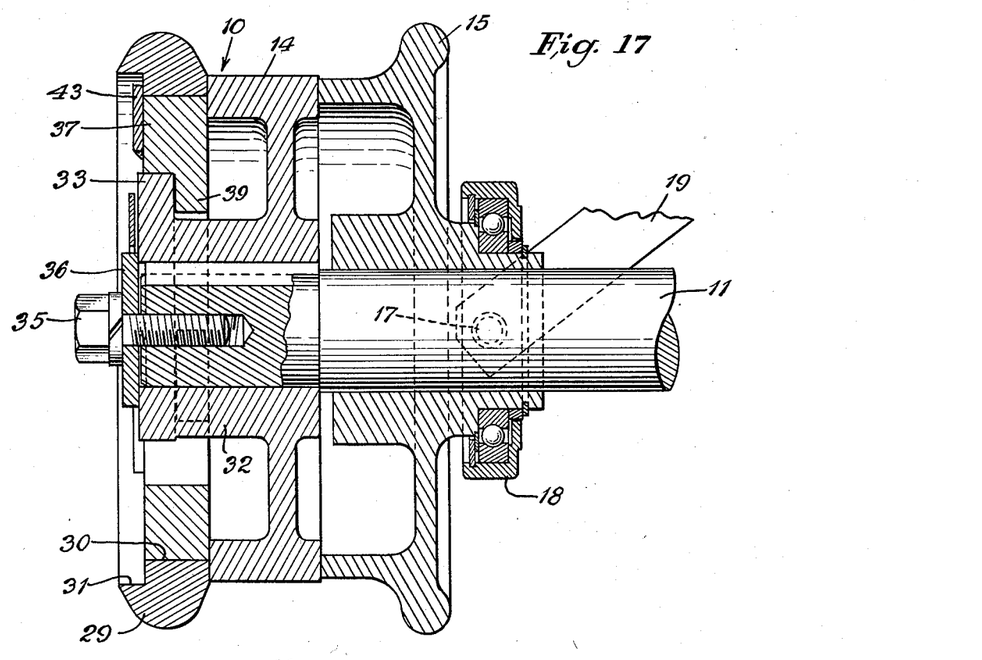
Figure 17 is a sectional view of the wheel construction shown in Figure 12 taken along the section line 17—17 of Figure 12.

The wheel construction includes a removable outer flange 29 which is formed so as to accommodate the wheel to different rail head sizes. The outer flange is illustrated in Figures 14 and 15. It is formed as a ring with a central opening 30. The flange body also includes a recessed portion 31 on one face thereof. The recessed portion 31 has a diameter greater than that of the central opening 30. The diameter of the recess 31 corresponds to the diameter of the roller 14. Thus the flange 29 may be positioned as shown in Figure 16 with the outer face of the roller 14 received in the recess 31 or it may be positioned as shown in Figure 17, with the opposite face of the flange in snug abutting relation with the roller 14. In this position, the recess 31 faces outwardly.

The central roller 14 includes a hub 32 which terminates at its outer end in projections 33 which extend radially outwardly from the axis of the hub. The projections 33 are equally spaced so as to define openings 34 therebetween. The central roller may be keyed to the axle 11 and held against sliding movement on the axle 11 by any suitable means, such as the bolt 35 and locking element 36 indicated in Figure 17.

A locking ring 37 (shown in Figure 13) has an outer diameter corresponding to the diameter of the opening 30 in the flange 29. The locking ring 37 has a central opening 38 corresponding in diameter to the diameter of the circle described by the outer edges of the projections 33 during rotation of the projections 33. The locking ring includes projections 39 which extend into the opening 38. The projections 39 have a size and configuration conforming to the openings 34, so that the locking ring 37 may be slipped into position over the projections 33. It should be noted in Figure 17 that the projections 33 are spaced outwardly from the outer face of the roller 14. The locking ring 37 and projections 39 have a size such that when the locking ring is positioned as shown in Figure 17, the projections 39 will abut against the inner faces of the projections 33. The locking ring 37 includes a lug 40 which is carried on a spring arm 41. The spring arm 41 is secured to the outer face of the locking ring 37 by any suitable means, such as a bolt or the like 42. The lug 40 has a size and configuration conforming generally to the size and configuration of the projections 39 and it is positioned so that the spring arm 41 biases it toward the openings between the projections 39.

Figures 10, 12, 13:
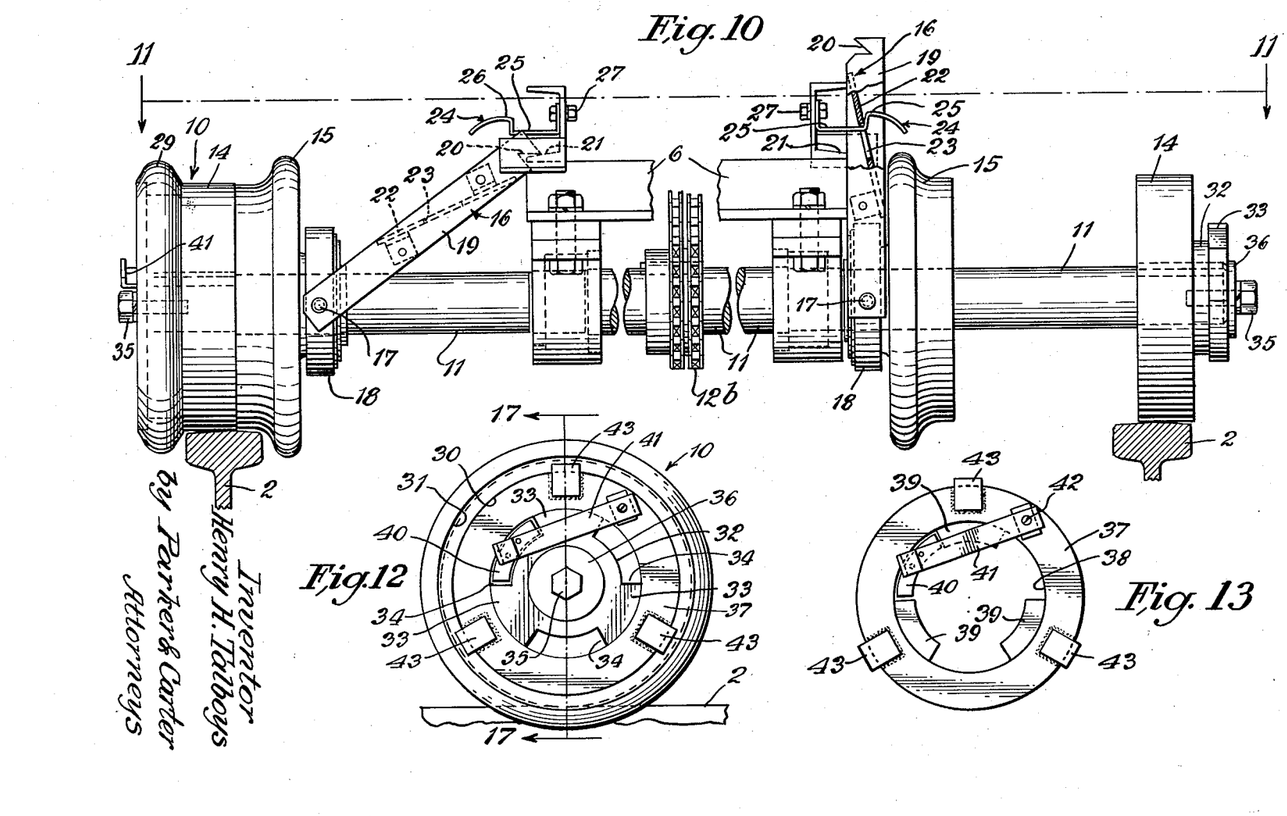
Figure 10 is an elevational view of a typical supporting wheel construction utilized in the invention.
Figure 12 is a side view of a typical supporting wheel.
Figure 13 is a side view of a typical wheel flange locking assembly utilized in the wheel construction shown in Figure 12.
Figure 11:
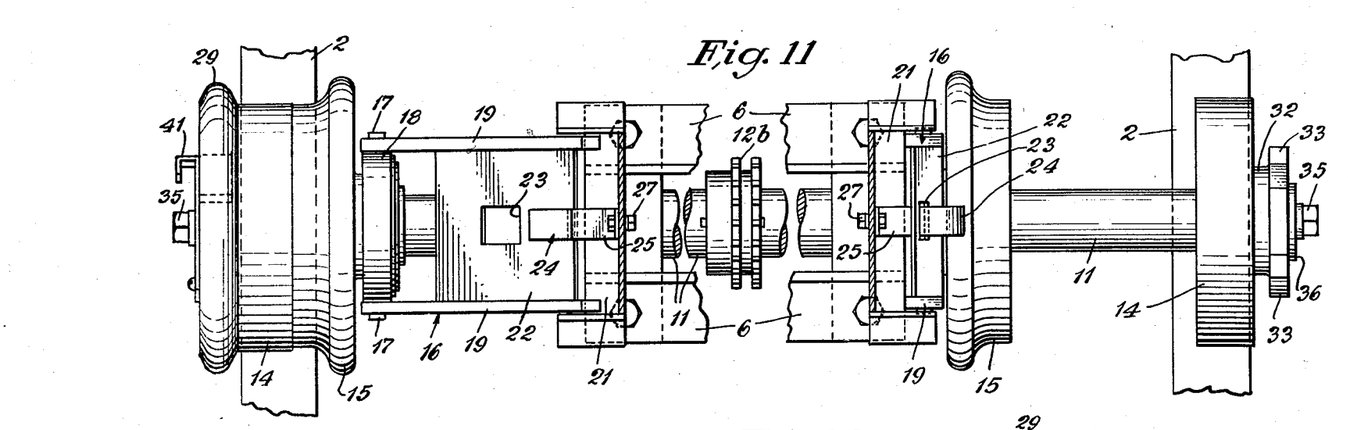
Figure 11 is a plan view of the supporting wheel construction shown in Figure 10 taken along the section line 11—11 of Figure 10.

The locking ring also includes outwardly extending flanges 43 which are spaced about the ring 37. They are effective to engage the outer face of the flange 29 and hold the flange 29 snugly against the roller 14.

When it is desired to position the outer flange 29 against the roller 14, the flange 29 is assembled with the locking ring, so that the flanges 43 abut against the face of the recess 31, as shown in Figure 17, or against the other face of the flange, as shown in Figure 16, depending upon the size of the head of the rail over which the wheel travels. The assembled flange 29 and the locking ring 37 are then moved over the projections 33, the projections 39 then being generally aligned with the spaces 34 between the projections 33. The flange and locking ring are moved into snug abutting relation with the roller 14 and the locking ring 37 is then rotated so as to position the projections 39 between the projections 33 and the roller 14. It is rotated to the position shown in Figure 12 and at this position the dog 40 snaps into the space between the projections 39, thus preventing further rotation of the locking ring 37 with relation to the roller 14. When the roller is thus assembled, the projections 39 prevent outward displacement of the flange 29 with respect to the roller 14.

When the outer flange 29 is to be removed, the dog 40 is moved outwardly against the bias of the spring arm 41 and the locking ring is then rotated to a position where the projections 39 are generally aligned with the spaces 34. The flange 29 and locking ring 37 may then be removed from the roller 14.

Figure 18:
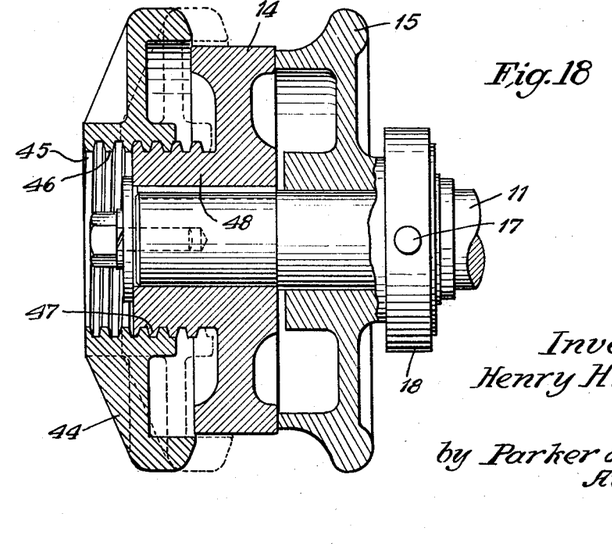
Figure 18 is a sectional illustration of a modified wheel construction.

In Figure 18, I illustrate a modified form of wheel construction. In this figure, the roller 14 is the same as that indicated in the other figures and the inner flange 15 is the same. In this figure, however, an outer flange 44 has a central bore 45 provided with screw threads 46 which are engageable with cooperating screw threads 47 on the hub 48 of the roller 14. In this figure, the outer flange 44 is removed from the roller 14 by rotating it with respect to the roller 14. It may be adjusted to any desired position with respect to the roller 14 so as to accommodate various sizes of rail heads. Any suitable locking means (not shown), such as a key and key-way construction, may be employed to prevent relative rotation of the flange 44 with respect to the roller 14, once the desired position of adjustment has been reached.

Each of the wheels 10 is formed in the manner shown in Figures 10–17 and the outer flanges 29 may be selectively positioned on the wheels on either side of the machine. When both the inner and outer flanges are removed from the roller 14, a person may sight along the track without having the line of sight disturbed by the wheel construction. This is highly important to the track lining operation.

I employ a locking assembly for the machine at each end of the frame. The locking assemblies are adapted when actuated to prevent vertical movement of the machine with respect to the track and thus form a generally unitary structure of the machine and track. A locking assembly 67 is provided at one end of the machine and a locking assembly 68 is provided at the other. Each of the locking assemblies are identical in structure and in operation and for this reason only one will be described in detail.

Figures 6, 20:
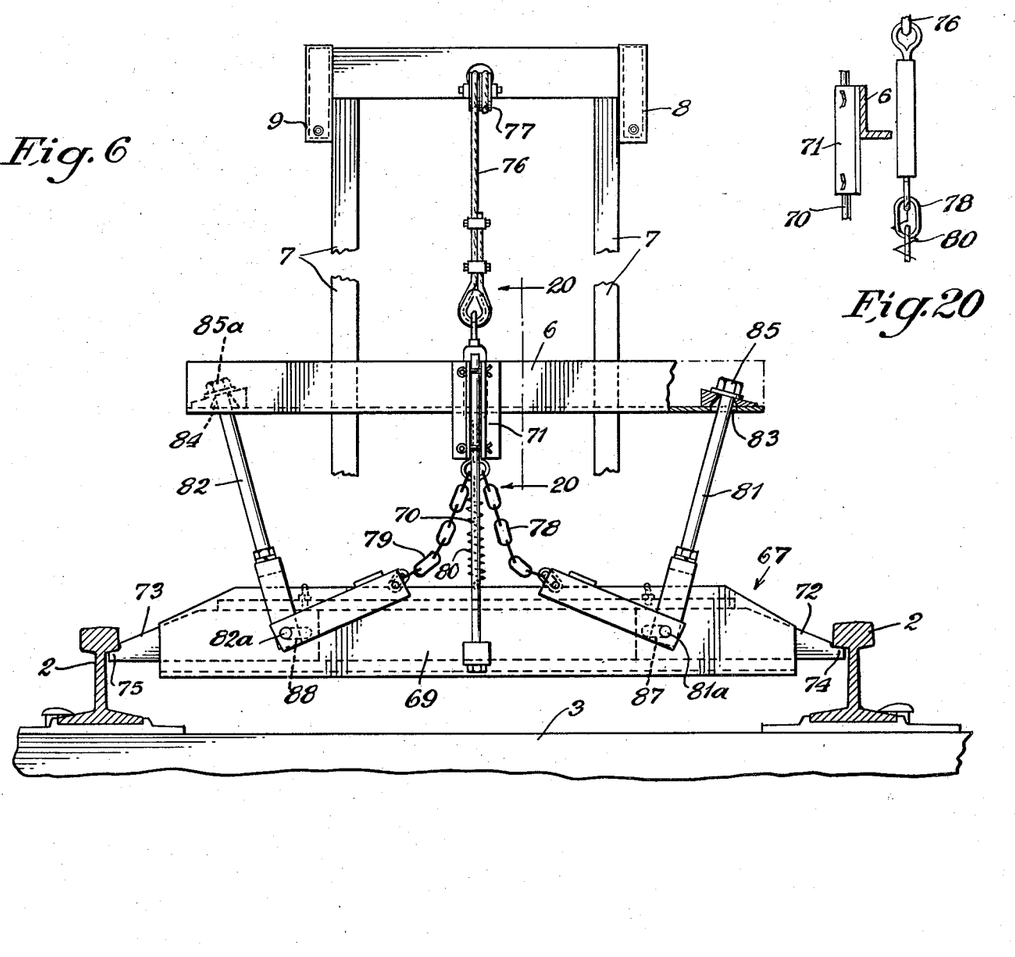
Figure 6 is an end elevation of the assembly shown in Figure 1 with certain portions being omitted for purposes of clarity and with the elements shown in Figure 1 in a different operative position.
Figure 20 is a sectional view taken along the lines 20—20 of Figure 6.

As will be seen best in Figure 6, each locking assembly includes a support 69 adapted to be lowered into a position between the rails 2. The support 69 is constrained for movement in a direction perpendicular to the axis of the wheels as by means of a guide rod 70, receivable within a guideway 71 carried by the frame. The support houses locking elements 72 and 73, adapted for outward and inward sliding movement in the support. Each element has a tapered end portion 74 and 75 respectively, adapted to underlie the head of the rail, when the elements are moved to their outer position. When withdrawn into the support 69, the elements 74 and 75 will clear the rails and thus allow movement of the locking assembly into and out of the space between the rails.

Figures 2, 5:
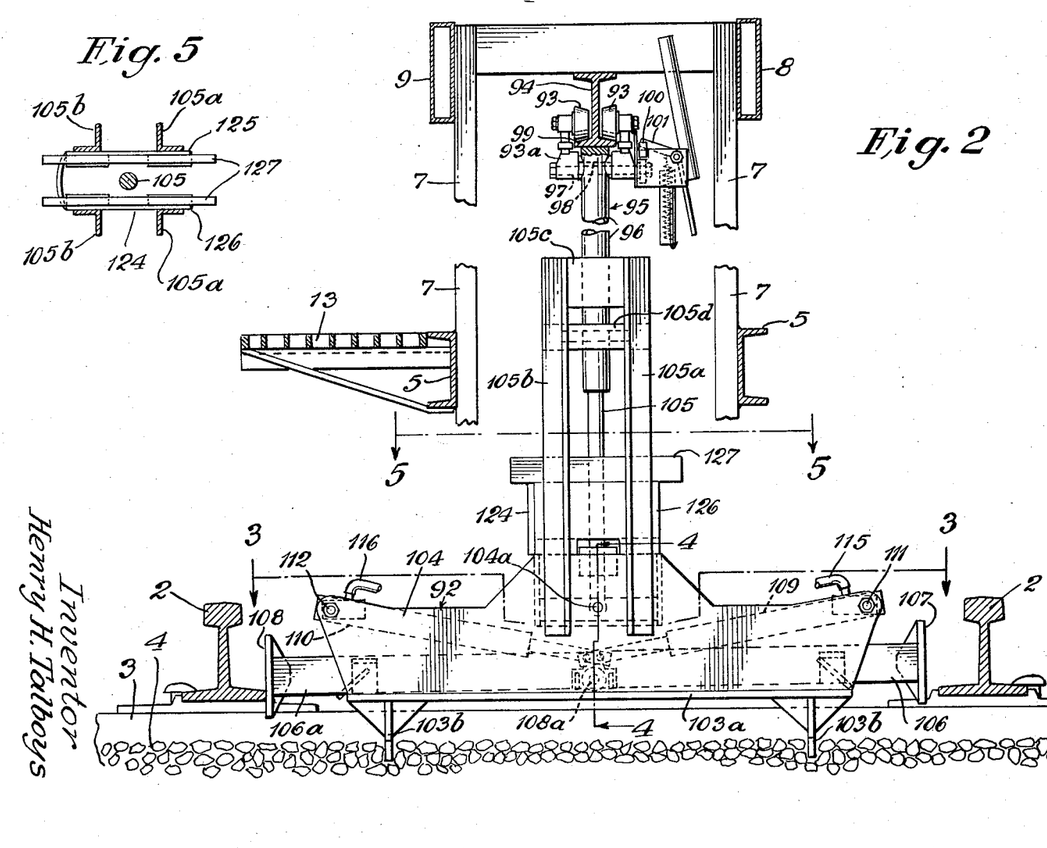
Figure 2 is an elevation of certain portions of the assembly shown in Figure 1.
Figure 5 is a sectional view taken along the section line 5—5 of Figure 2.
Figure 3:
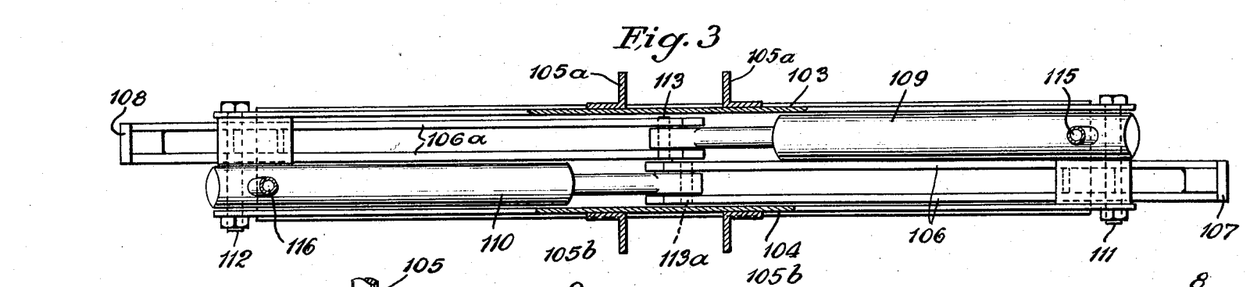
Figure 3 is a sectional view of the elements shown in Figure 2 taken along the section line 3—3 of Figure 2.
Figure 4:
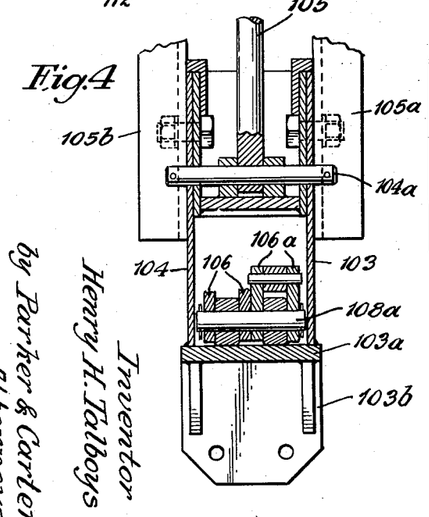
Figure 4 is a sectional view of certain portions of the elements shown in Figure 2 taken along the section line 4—4 of Figure 2.

The assembly is adapted to be raised and lowered by means of a cable 76, or other equivalent mechanism. The cable 76 is interconnected with the support 69 and elements 72 and 73 by means of flexible links in the form of chain links 78 and 79 and a spring 80. The spring 80 is connected between the cable 76 and the support 69, whereas the chain links 78 and 79 are connected between the cable 76 and the elements 72 and 73 respectively. As will be seen in Figures 1 and 2D, the cable 76, spring 80, and chains 78 and 79 are positioned rearwardly of the support 6. As shown, the cable 76 is reeved about a pulley 77 carried by the frame. By releasing the cable 76, the locking assembly will fall down into the space between the rails. By pulling the cable 76 upwardly, the assembly will be lifted out of the space between the rails.

I include a guide structure adapted to force the elements 72 and 73 outwardly upon downward movement of the locking assembly. The guide structure also serves as a force transmitting means for transmitting an upward thrust exerted against the frame to the elements 72 and 73, and thus to the rails. The guide structure includes guide links 81 and 82 pivotally connected to the elements 72 and 73 respectively as at 81a and 82a respectively. Each of the elements 81 and 82 are slidably and pivotally mounted in the frame. They may, for example, extend through guiding slots 83 and 84 in the frame. Any suitable means, such as nuts 85 and 85a, may limit the downward sliding movement of the links 81 and 82 with respect to the slots and frame.

The guide structure is so arranged that when the locking assembly is in a position above the rails, the stops 85 and 85a are positioned upwardly and away from the guiding slots 83 and 84. This is shown in Figure 1. Upon initial downward movement of the support 69, the elements 72 and 73 will pull the links 81 and 82 through the slots. This will continue to a point (Figure 7) where the stops 85 and 85a prevent further sliding movement. At this point the locking assembly will be approaching the lower or rail engaging position. At this point in the downward movement, however, the support 69 will still exert a downward force on the links 81 and 82. This downward force will cause the links 81 and 82 to swing about the slots 83 and 84 as pivots and the lower ends of the links will start a downward and outward movement, thus forcing the locking elements 72 and 73 outwardly into rail-engaging position. The outward movement may be limited by slots 87 and 88 in which pivot pins 81a and 82a, between the links 81 and 82 and elements 72 and 73, ride. Preferably the slots are so positioned that they limit the outward extension of the elements 72 and 73 to a point where the ends of the locking elements are spaced a slight distance from the web of the rail. Furthermore, the stops 85 and 85a are so adjusted that the portions 74 and 75 of the locking elements are positioned a very slight distance beneath the underside of the rail head.

Figure 7:
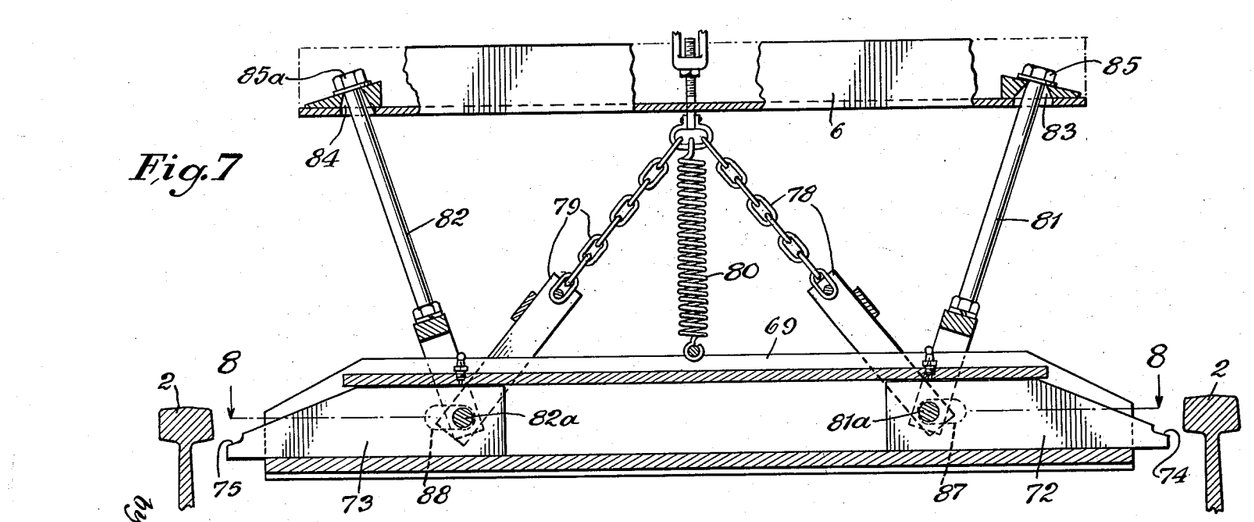
Figure 7 is an enlarged detail view of certain elements shown in Figure 6 with certain portions being shown in section for purposes of clarity.
Figure 8:
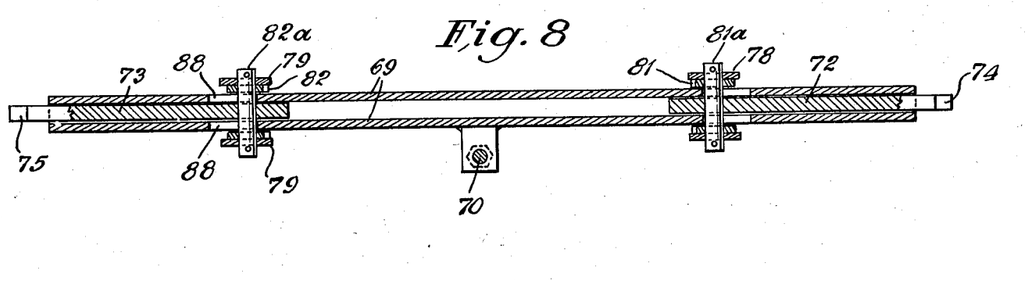
Figure 8 is a sectional view of the device shown in Figure 7 taken along the section line 8—8 of Figure 7.

When it is desired to disengage the locking assembly from the rails, the cable 76 is drawn upwardly about the pulley 77. During initial upward movement, the chain links 78 and 79 pull the lower ends of the links 81 and 82 inwardly and upwardly about the slots 87 and 88 and 83 and 84 as pivots and the locking elements 72 and 73 will be withdrawn inwardly while the support 69 is in the same position, the spring 80 at that time being tensioned to allow relative movement between the cable 76 and support 69. When the locking elements 72 and 73 have moved inwardly a sufficient distance to clear the rails, the support 69 will commence its upward movement and in the course of this upward movement, the guide links 81 and 82 will slide upwardly through the guiding slots 83 and 84.

It should be noted that with this form of locking assembly, forces are transmitted directly between the rails and the frame and not through the power unit which is employed to raise the locking assembly. Power is required only in case of raising the assemblies to their inoperative position. The power may be supplied by any suitable fluid motor 76a for pulling the cables 76 on each end of the frame upwardly. The piston of the motor may be connected to the cables 76 so that reciprocation of the piston raises and lowers the locking assemblies.

The machine includes a plurality of thrust assemblies designated generally at 90 and 91. The thrust assemblies 90 and 91 include ballast engaging elements 92 at the lower end thereof. Each of the assemblies is mounted for longitudinal movement with respect to the frame, as by means of rollers 93 carried by the assembly and riding on a longitudinally extending track or slideway 94. The thrust assemblies are adapted to exert an upward thrust against the machine and relieve the weight of the machine and the track structure, to which the machine is secured, from the supporting ballast.

Figure 9:
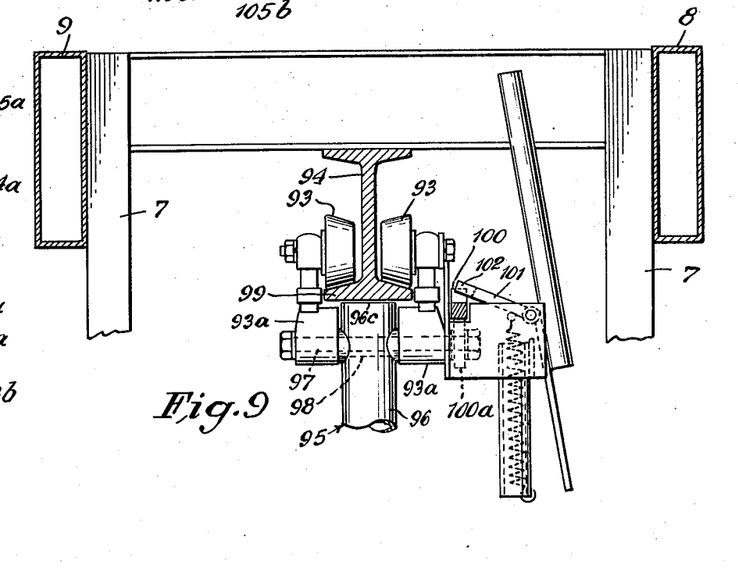
Figure 9 is an enlarged detail view of a supporting and positioning assembly utilized in the invention.

The assemblies 90 and 91 may be identical and for this reason only one will be described in detail. Each assembly includes an extensible member in the form of an hydraulic ram 95. The cylinder 96 of the ram is pivotally connected with the rollers 93. Depending arms 93a are spaced on opposite sides of the track and support a pivot pin 97, from the rollers 93 and track 94, thus forming a carriage for the ballast engaging assemblies. The pivot pin 97 extends through a bore 98 in the end wall of the cylinder, as will be seen in Figure 9. The bore is made sufficiently large with respect to the pin 97 that the upper end of the cylinder is spaced a slight distance from the under surface 99 of the track when the cylinder 96 is supported on the pin 97 and at the same time allows movement of the cylinder in an upward direction with respect to the pin, so that the upper end wall 96c of the cylinder may contact the portion 99 of the track without raising the rollers 93 from the track.

The carriage includes a roller 100a engageable with the under surface of an elongated rack 100 which is supported alongside the track 94. Each of the roller assemblies 93 includes a pivotally mounted, spring biased pawl 101 having teeth 102 engageable with the teeth of the rack to hold the assemblies in selected longitudinal positions.

Conduits 96a and 96b may be connected with the cylinder 96 so as to selectively raise and lower the piston carried by the cylinder.

The ballast engaging element 92 is formed by a pair of supporting plates 103 and 104. It includes a lower member 103a and depending shoes 103b which penetrate the ballast bed and provide a firm footing. The supporting plates are pivotally mounted as by means of pin 104a on the piston rod 105 of the hydraulic ram so as to accommodate the thrust assemblies to uneven ballast bed and thus provide a firm footing in the ballast. The plates 103 and 104 are adapted to be positioned in the cribs between the supporting ties of the track.

A pair of upstanding reinforcing members 105a and 105b are joined to each of the plates 103 and 104. They extend upwardly to a point above the frame members 5 and the operator platform. The operator may grasp the upper ends of these elements to aid in sliding the ballast engaging assembly along the track 94. Each pair of upstanding members may be connected to one another at their upper ends by means of suitable cross-members 105c, as shown in Figure 2.

The inner surfaces of the members 105a and 105b are adapted for sliding engagement with the opposite sides of a block-like structure 105d which is fixed to the cylinders. As formed, the members 105a and 105b allow pivotal movement of the ballast engaging member about the piston rod and reciprocation with respect to the cylinder. They prevent twisting of the ballast engaging elements with respect to the cylinder and prevent bending of the piston rods.

Thrust bars 106 and 106a are slidably mounted between the plates 103 and 104 and include thrusting heads 107 and 108 at their outer ends. The thrusting heads 107 and 108 have flat outer surfaces for contact with the base of the rails. The inner ends of the thrust bars 106 and 106a are connected together by means of a common pivot pin 108a. A pair of opposed hydraulic rams 109 and 110 are pivotally mounted in the plates 103 and 104 as at 111 and 112 respectively. The pistons of these rams are pivotally connected to the thrust bars 106 and 106a as at 113 and 113a.

The outer ends of the cylinders 109 and 110 are supplied with fluid through conduits 115 and 116 respectively. When fluid is supplied through the conduit 115, fluid is exhausted through the conduit 116 and the thrust bars will be moved to the left, as seen in Figure 2. Conversely, when fluid is supplied through the conduit 116, fluid is exhausted through the conduit 115 and the thrust bars 106 will be moved to the right, thereby to direct an opposite lateral thrust against the track structure. The two rams 109 and 110 act, in effect, as a double-acting ram. Valve means, which will be described later in this specification, are actuated selectively to move the thrust bars 106 and 106a to one side or the other, depending upon the direction of the desired movement of the thrust.

The thrust bars 106 and 106a have a combined length less than the gauge of the rails, so that when the pistons 105 are lowered to direct an upward thrust against the machine, the thrust bars will fit within the space between the rails. After the track has been shifted to one side or the other by the thrust bars 106 or 106a, the thrust bars are moved back to the neutral or generally intermediate position to allow the piston 105 to raise the ballast engaging elements and thrust bar above the level of the ties.

Whereas I have shown two ballast engaging elements and thrust assemblies in the drawings, I wish it to be understood that more may be employed if considered necessary and under some circumstances, only a single element and thrust assembly may be employed. I have found that two such elements and thrust assemblies are preferable in the machine, although I do not wish the invention to be limited to two such assemblies and elements.

Figure 19:
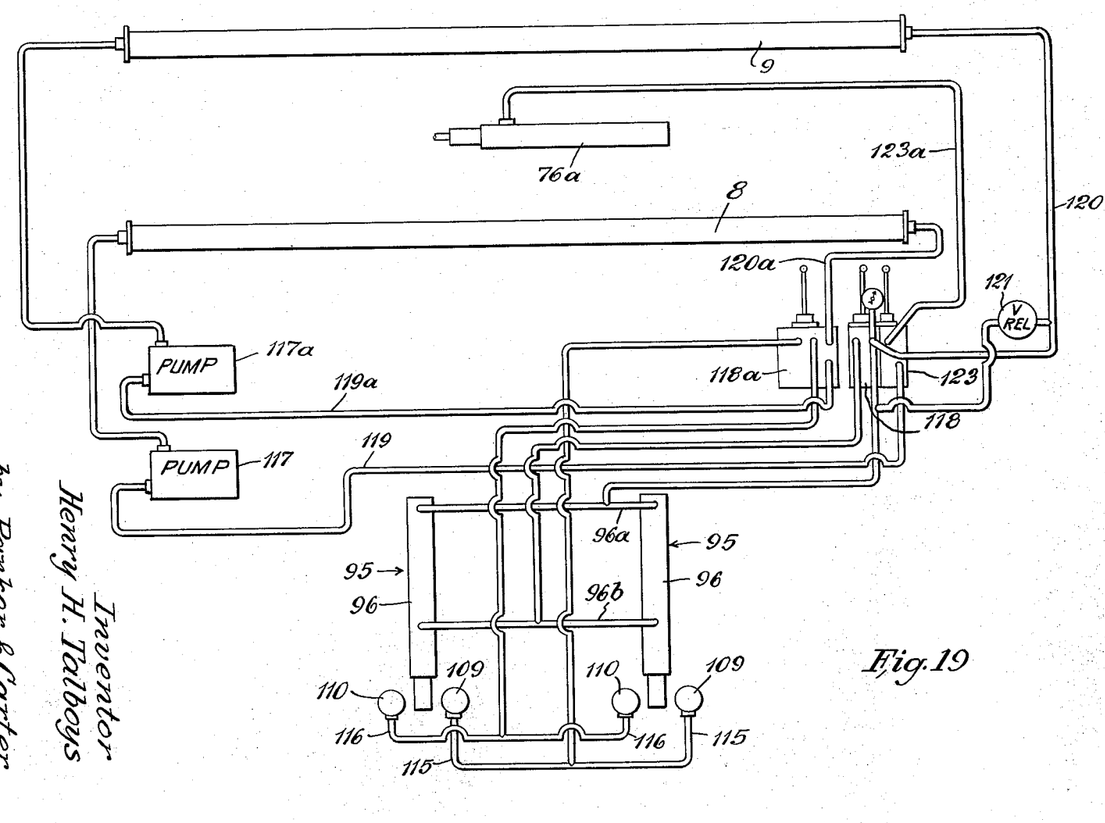
Figure 19 is a diagrammatic showing of the hydraulic circuit utilized in the invention.

In Figure 19, I have illustrated a preferred hydraulic circuit for the machine.

The circuit may include, for example, pumps 117 and 117a driven by the engine 12 and receiving fluid from the reservoirs 8 and 9. A manually actuated valve assembly 118 may be connected to the pressure line 119 from the pump 117 for control of the rams 96. The assembly may include a conduit 120 for exhausting fluid to the reservoir 9. The conduits 96a and 96b are connected with the valve 118, so that the pressure line 119 and exhaust line 120 may be selectively connected to these conduits, thus to selectively raise and lower the pistons 105. An adjustable pressure regulating valve 121 is positioned between the valve 118 and the cylinder 96, so as to regulate the pressure delivered to the cylinder during lowering of the pistons 105. Any suitable manually actuated valve 118a may be located between pressure line 119a from pump 117a, exhaust line 120a and the conduits 115 and 116 leading to the rams 109 and 110, so as to selectively govern movement of these rams and the thrust bars 106 and 106a. A third manually actuated valve 123 may be connected to the pressure line 119 and to a conduit 123a leading to the cylinder 76a for raising and lowering the cables 76. I wish it to be understood that the valves 118, 118a and 123 may take any one of several forms well known to the art and for this reason I do not illustrate them in detail. Preferably, they are each provided with an actuating lever mounted on the frame for operation by the user of the machine.

In Figures 2 and 5, I illustrate an insertable stop 124 which is employed to limit the upward travel of the ballast engaging elements, once they have been lowered, to a point just sufficient to clear the ties. As shown, the stops are generally U-shaped in form and are adapted to be inserted between the generally upright members 105a and 105b. When so inserted, the legs 125 and 126 of the stops straddle the piston rod. The upper portion 127 of the stop, when inserted, is adapted to abut the member 105d when the ballast engaging elements have been moved an upward distance sufficient to clear the ties.

By thus limiting the upward movement of the ballast engaging elements, the overall time required to move the assembly from one position to the next along the track rails is lessened. When transporting the machine over comparatively large distances, the stops are removed so that the ballast engaging elements may be moved upwardly throughout their full range of travel. Furthermore, by limiting the movement of the elements to a position just above the ties, it is easier for the operator to "spot" the elements over the cribs.

Whereas I have shown and described a preferred form of my invention, I wish it to be understood that there are many modifications to the invention which will be apparent to those skilled in the art and which will fall within the scope and spirit of the invention. The drawings and description of the invention should be taken in a diagrammatic or illustrative sense only and not in any limited sense. The scope of the invention should be limited only by the scope of the hereinafter appended claims.

The use and operation of my invention are as follows:

I illustrate a track lining machine which is self-powered and which may be propelled along the track from one track lining position or location to another.

When the machine is correctly "spotted" over the track, the operator releases the fluid from the cylinder 76a, thus allowing the locking assembly at each end of the machine to drop by gravity into locking position where the ends 74 and 75 of the locking elements extend beneath the inner side of the head of the rails 2. The operator then actuates the valve 118 to extend the thrust assemblies 90 and 91 and cause the ballast engaging elements 103a to move downwardly into engagement with the ballast in the cribs. In case the thrust assemblies 90 and 91 are not spaced properly for entry into the cribs, the operator may release the locking pawl 101 and slide either one or both of the thrust assemblies in a longitudinal direction and thus properly position them. As the ballast engaging elements 92 contact the ballast, a reactive pressure will be exerted upwardly through the cylinders 96 and the cylinders will move upwardly to a point where they contact the lower portion 99 of the track 94, thus relieving the roller assemblies from the thrust between the frame of the machine and the ballast. The pressure regulating valve 121 is adjusted so that the maximum pressure delivered by the pump 117 to the cylinders 96 relieves substantially the entire weight of the machine and the track from the ballast without actually lifting the track from the ballast. Under some circumstances, as in the case of old ballast, it may be necessary to exert a slight lifting movement to the track in order to free the ties 3 from particles of ballast which may be keyed into the under surfaces of the ties. Under normal circumstances, however, such lifting is not necessary. It should be noted that when the cylinders 96 are exerting an upward thrust on the frame of the machine, the locking elements 72 and 73 will be exerting a similar upward thrust on the track, through the agency of the guide links 81 and 82. Thus, the machine and track are formed into a relatively heavy, vertically loaded, unitary structure.

With the weight of the machine and track relieved from the ballast, the operator actuates the valve 118a to move the thrust bars to one side or the other, as the particular situation may require, and thus exert a lateral thrust on the track. The track then slides over the ballast, in the particular direction desired, in order to line the track properly. In case the operator moves the track too far to one side, he may reverse the flow of fluid to the rams 109 and 110 and move the track in the opposite direction.

A highly important feature of the invention is the provision of the particular wheel assemblies shown herein. Both flanges from both wheels on one side of the machine may be removed so that a foreman, or other person directing the lining operation, may sight along one rail with an uninterrupted line of sight. He is able to see each portion of the rail of that section of the track requiring alignment. It should be noted that the rail engaging elements extend under the inner sides of the rail heads and thus do not interfere with the sighting operation.

After a particular section of track has been properly aligned, the operator actuates the valve 118a to position the thrust bars 106 and 106a centrally of the ballast engaging elements and withdraws the pistons 105 upwardly within the cylinders 96 by means of actuation of the valve 118. The operator then actuates the valve 123 to deliver fluid to the motor 76a to pull the locking assemblies upwardly and out of engagement with the rams. The machine can then be moved along the track to another section requiring alignment.

I claim:

1. A track working assembly, including a frame constructed for movement along the rails of a track, means on the frame for releasably locking the frame to the rails to thereby prevent upward movement thereof, downwardly directed thrust means connected to the frame having a ballast engaging element connected adjacent the lower end thereof, said thrust means being extendible so that the ballast engaging element may be forced downwardly against the ballast and retractable to a maximum withdrawn position, power means for actuating the thrust means to force the ballast engaging element downwardly against the ballast thereby applying a generally vertical thrust between the ballast and the frame and for withdrawing the ballast engaging element to its maximum withdrawn position, and a selective movement-limiting means for limiting the upward movement of the ballast engaging element to an intermediate withdrawn position, and at least one insertable stop which, when inserted engages the ballast engaging element, and a block mounted on the thrust means in spaced relation to the ballast engaging element, in a path of upward movement of the stop when the thrust means is retracted to be engaged thereby before the ballast engaging element reaches its maximum withdrawn position.

2. A track working assembly, including a frame constructed for movement along the rails of a track, means on the frame for releasably locking the frame to the rails to thereby prevent upward movement thereof, downwardly directed thrust means connected to the frame having a ballast engaging element connected adjacent the lower end thereof, said thrust means being extendible so that the ballast engaging element may be forced downwardly against the ballast and retractable to a maximum withdrawn position, power means for actuating the thrust means to force the ballast engaging element downwardly against the ballast thereby applying a generally vertical thrust between the ballast and the frame and for withdrawing the ballast engaging element to its maximum withdrawn position, and a selective movement-limiting means for limiting the upward movement of the ballast engaging element to an intermediate withdrawn position, the ballast engaging element being pivoted to the thrust means about an axis generally parallel to the rails, and further including guide means on the thrust mechanism for guiding and positioning the ballast engaging element during movement thereof to resist any tendency of the ballast engaging element to pivot about an axis lateral to the rails.

3. In a track working machine or the like, a base movable along the rails of a track, means on the base for locking the base against upward movement from the track, an extendible downwardly directed thrust means connected to the base, a ballast engaging element pivoted to the thrust means adjacent its lower end about an axis generally parallel to the rails of the track, said ballast engaging element being adapted to engage the ballast upon actuation of the thrust means, power means for actuating the thrust means to thrust the ballast engaging element downwardly against the ballast thereby applying a generally vertical thrust between the ballast and the base and for withdrawing it, and guide means on the thrust mechanism engaging the ballast engaging element for guiding and positioning the ballast engaging element during movement thereof to resist any tendency of the ballast engaging element to pivot about an axis lateral to the rails, said guide means including a plurality of generally parallel upright reinforcing members extending between the ballast engaging element and the thrust means in sliding engagement with one of them affixed to the others 4. The structure of claim 3 wherein the upright reinforcing members are affixed on the ballast engaging element and are constructed to move therewith and are in sliding engagement with the thrust means, and further include a block mounted on the thrust means in spaced relation to the ballast engaging element and having front and rear faces, the reinforcing members being in sliding engagement with the front and rear faces of the block.

5. The structure of claim 4 further characterized by and including a manually insertable stop between the reinforcing members in engagement with the ballast engaging element adapted to engage the block after a predetermined limited upward movement of the ballast engaging element.

6. In a track working machine or the like, a frame movable along the rails of the track, an extendible thrust means connected to the frame including a ballast engaging element for engaging the ballast upon actuation of the thrust means, means for actuating the thrust means to thrust the ballast engaging element downwardly against the ballast and for withdrawing it, and means for locking the frame against upward movement from the track including a vertically movable locking assembly adapted to be disposed generally above the rails in its raised position and generally between the rails in its lowered position, power means on the frame for raising and lowering the locking assembly, rail engaging elements slidably mounted on the locking assembly to be extended laterally therefrom, connecting means extending between the rail-engaging elements and the power means associated with the locking assembly for holding the rail-engaging elements in a withdrawn position until after the locking assembly has been lowered to a position generally below the heads of the rails, and means on the locking assembly for extending the rail-engaging elements laterally therefrom to interlock with the rails.

7. The structure of claim 6 further characterized in that said last mentioned means includes a connection between the frame and the locking assembly for extending the rail-engaging elements at a point between the head and flange of the rail so that the frame will be locked to the rail head.

8. The structure of claim 6 further characterized in that said last mentioned means includes at least one link connected between the frame of the machine and at least one of the rail-engaging elements.

References Cited in the file of this patent

UNITED STATES PATENTS

| | | | |
|---|---|---|---|
| Re. 24,564 | Herlehy | Nov. 11, | 1958 |
| 976,440 | Cush | Nov. 22, | 1910 |
| 1,338,208 | Blanton et al. | Apr. 27, | 1920 |
| 1,458,402 | Forsberg | June 12, | 1923 |
| 1,624,160 | Craig | Apr. 12, | 1927 |
| 1,733,520 | Talboys | Oct. 29, | 1929 |
| 1,784,963 | Holt et al. | Dec. 16, | 1930 |
| 1,977,276 | Holt et al. | Oct. 16, | 1934 |
| 2,050,179 | Holt et al. | Aug. 4, | 1936 |
| 2,693,769 | Herlehy | Nov. 9, | 1954 |
| 2,736,268 | Yohe | Feb. 28, | 1956 |
| 2,760,440 | Kershaw | Aug. 28, | 1956 |
| 2,762,313 | Sublett | Sept. 11, | 1956 |
| 2,843,055 | Hursh et al. | July 15, | 1958 |